United States Patent [19]

Jeng

[11] Patent Number: 5,284,109
[45] Date of Patent: Feb. 8, 1994

[54] FEEDING DEVICE HAVING MECHANISM FOR RELEASING FEED AT PRE-ARRANGED INTERVALS

[76] Inventor: Jieh-Chin Jeng, No. 8, Lane 732, Chung-Chen Rd., Yen-Hsing Tsun, Yung-Kang Hsiang, Tainan Hsien, Taiwan

[21] Appl. No.: 9,825

[22] Filed: Jan. 27, 1993

[51] Int. Cl.⁵ .............................................. A01K 5/02
[52] U.S. Cl. ................................. 119/51.11; 119/56.2; 222/650; 222/243; 222/362
[58] Field of Search ................ 119/51.04, 51.11, 56.1, 119/56.2; 222/650, 344, 361, 362, 243, 339

[56] References Cited

U.S. PATENT DOCUMENTS

| | | | |
|---|---|---|---|
| 2,237,189 | 4/1941 | McCormack et al. | 222/361 |
| 2,857,083 | 10/1958 | Masterson | 222/362 |
| 3,056,532 | 10/1962 | Germano | 222/361 |
| 3,416,497 | 12/1968 | Riel | 119/51.11 |
| 3,434,459 | 3/1969 | Green | 119/56.1 |
| 4,162,868 | 7/1979 | Stapleton et al. | 119/56.2 |
| 4,175,679 | 11/1979 | Ponce et al. | 222/650 |
| 4,437,595 | 3/1984 | Stevens et al. | 119/51.11 |
| 5,140,944 | 8/1992 | Jeng | 119/51.04 |

FOREIGN PATENT DOCUMENTS

| | | | |
|---|---|---|---|
| 2336875 | 7/1977 | France | 119/56.1 |
| 2565066 | 12/1985 | France | 119/51.11 |
| 2580465 | 10/1986 | France | 119/51.11 |

Primary Examiner—Gene Mancene
Assistant Examiner—Todd E. Manahan
Attorney, Agent, or Firm—Ladas & Parry

[57] ABSTRACT

A feeding device includes a casing with a bottom and a container above the bottom. The bottom has a first opening extending therethrough while the container has an outlet adjacent to the bottom which lies on a straight line drawn across the first opening of the bottom. A food-carrying plate is provided between the container and the bottom and has a second opening which is aligned with the outlet of the container. An inverted U-shaped covering member includes a base disposed above the plate and has two arms connected to the bottom. The container is mounted on the base of the covering member. The covering member has a third opening formed through the base. The third opening is communicated with the outlet of the container and is aligned with the second opening of the food-carrying plate when the latter is not activated.

1 Claim, 4 Drawing Sheets

FEEDING DEVICE HAVING MECHANISM FOR RELEASING FEED AT PRE-ARRANGED INTERVALS

BACKGROUND OF THE INVENTION

Field of the Invention

This invention relates to a feeding device, more particularly to a feeding device which includes a casing that has a food-carrying plate which moves linearly in the casing in order to release feed from within.

Description of the Related Art

Breeding pets, such as birds in a cage or fishes in an aquarium, for recreation and as a hobby is growing in popularity among city dwellers. Some pets, such as fish, require proper feeding and regular replacement and circulation of water in the aquarium. However, pet breeders often forget or are unable to do these things for various reasons, such as travel to a distant place. As a result, the pets become ill and die of hunger.

There already exists a feeding device which can automatically release feed from within at pre-set intervals without the need for manual intervention. The feeding device includes a casing which has an upper portion with a container to receive feed therein and a lower portion with a top plate that has a first opening extending through the lower portion. The container has an outlet formed at the bottom of the same adjacent to the top plate of the lower portion. The lower portion includes a mounting shaft extending vertically therein, and a rotary plate is rotatably mounted to the mounting shaft above the top plate. The rotary plate seals the first opening of the top plate in a normal condition. The rotary plate includes a second opening formed therethrough. The second opening is off set from the axis of rotation and is substantially equal in size to the first opening of the top plate. The casing also includes a driving, unit to rotate the rotary plate and a device to timely actuate the driving unit so as to rotate the rotary plate by an angular distance between a first position, wherein, the second opening of the rotary plate is communicated with the outlet of the feed container, and a second position, wherein, the second opening of the rotary plate is communicated with the first opening of the top plate of the lower portion.

A main drawback of the above-identified feeding device is that it is not suitable for conveying lengthy feed, such as flakes. In order to convey flake-type feed, the rotary plate must possess a diameter of considerable length in order to permit the formation of an appropriately sized feed-carrying opening. As a result, the casing of the feeding device will have a bulky appearance.

SUMMARY OF THE INVENTION

Therefore, the main object of the present invention is to provide a feeding device which includes a food-carrying plate, which has a width that is shorter than the diameter of the rotary plate of the feeding device of the prior art and which moves linearly in the casing so as to convey and release flake-type feed from the casing.

Another object of the present invention is to provide a feeding device which includes a casing that is more compact and which does not look bulky when compared to the prior feeding device.

According to the present invention, the feeding device includes a casing that has a bottom with a first opening extending therethrough. A container for storing feed is provided above the bottom and has an outlet adjacent to the bottom. A food-carrying plate has a second opening formed therethrough. The food-carrying plate is provided between the bottom and the container and is movable horizontally along the bottom by means of a driving unit which drives the same at pre-set intervals between a first position, wherein the second opening of the food-carrying plate is aligned and communicated with the outlet of the container to receive the feed in the second opening, and a second position, wherein the second opening of the food-carrying plate is aligned and communicated with the first opening of the bottom to release the feed from within. At normal condition, the first opening of the bottom and the outlet of the container lie in a straight line. An inverted U-shaped covering member includes a base member mounted above the food-carrying plate across the straight line. The base member has two arm portions which extend downward therefrom and which are connected to the bottom. The container is disposed on the base member of the covering member. The base member of the covering member further has a third opening which is communicated with the outlet of the container and which is aligned with the second opening of the food-carrying plate when the food-carrying plate is at the first position. The covering member confines a guiding path above the bottom. The food-carrying plate extends through the guiding path and moves along the straight line when driven by the driving unit. The food-carrying plate has a rack which is connected to and which is driven by the driving unit so that the food-carrying plate moves linearly in the guiding path between the first and second positions.

BRIEF DESCRIPTION OF THE DRAWINGS

Other features and advantages of the present invention will become more apparent in the following detailed description, including drawings, all of which show a non-limiting form of the present invention, in which.

DESCRIPTION OF THE PREFERRED EMBODIMENT

Figure 1:
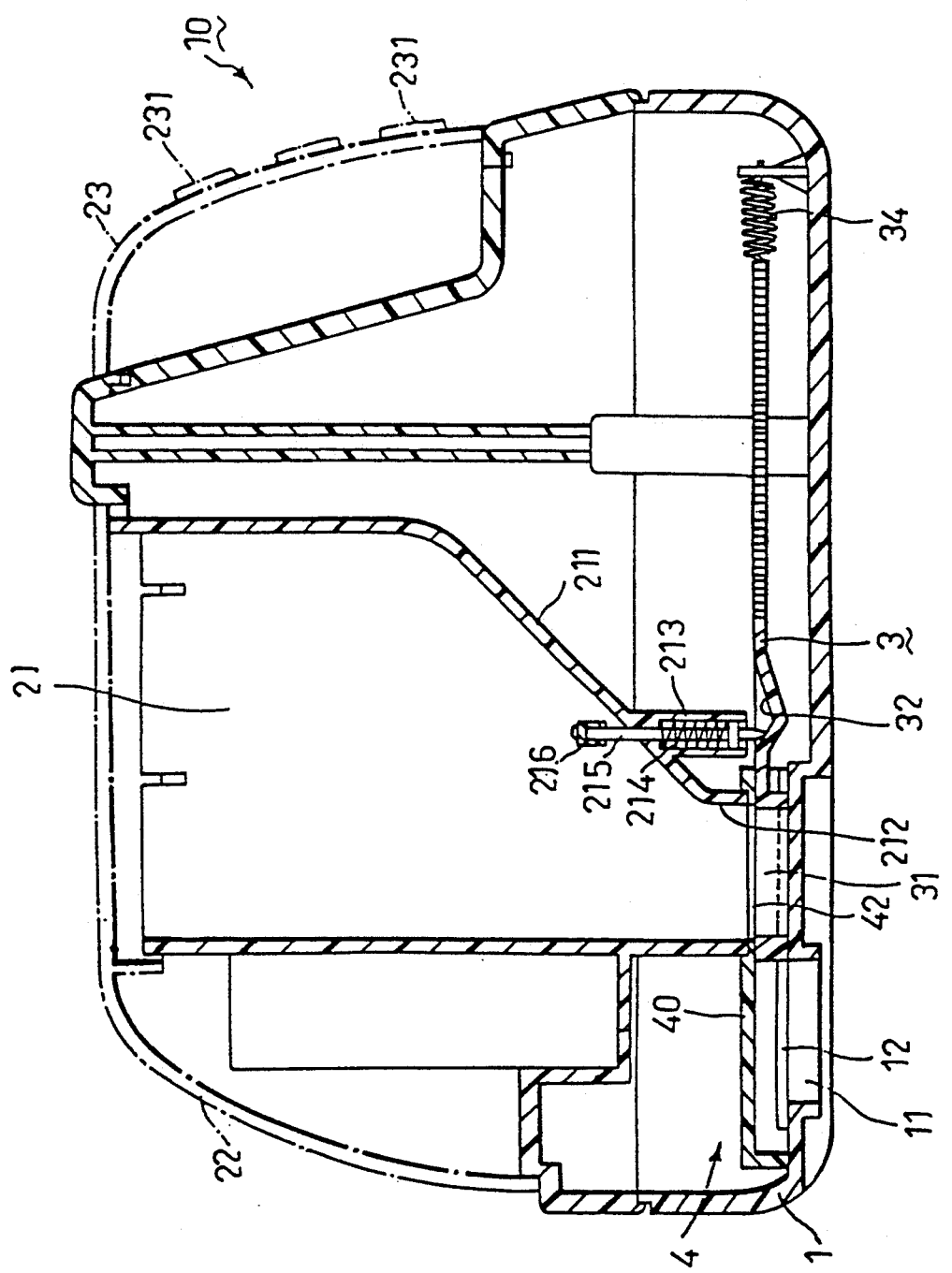
FIG. 1 shows a cross-sectional view of a preferred embodiment of the feeding device according to the present invention.
Figure 2:
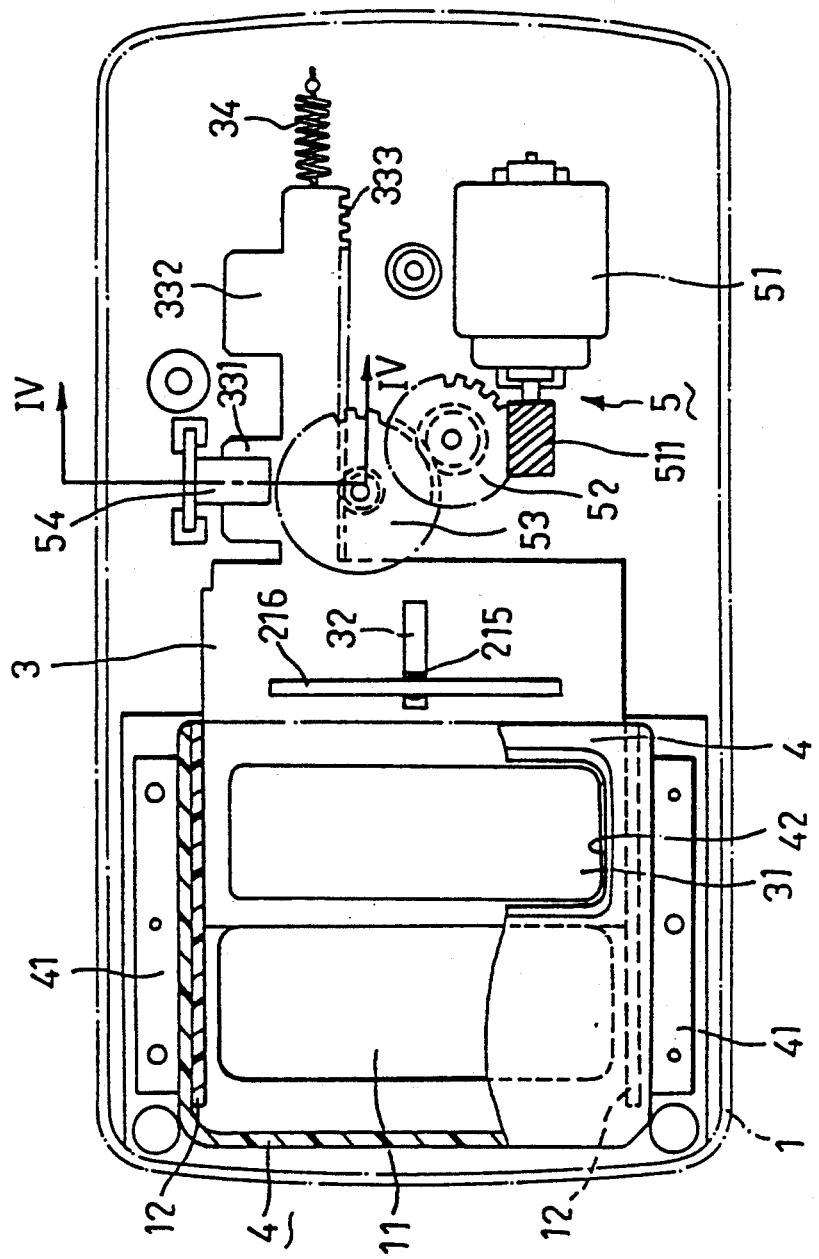
FIG. 2 shows a top view of the preferred embodiment of the feeding device of the present invention.
Figure 3:
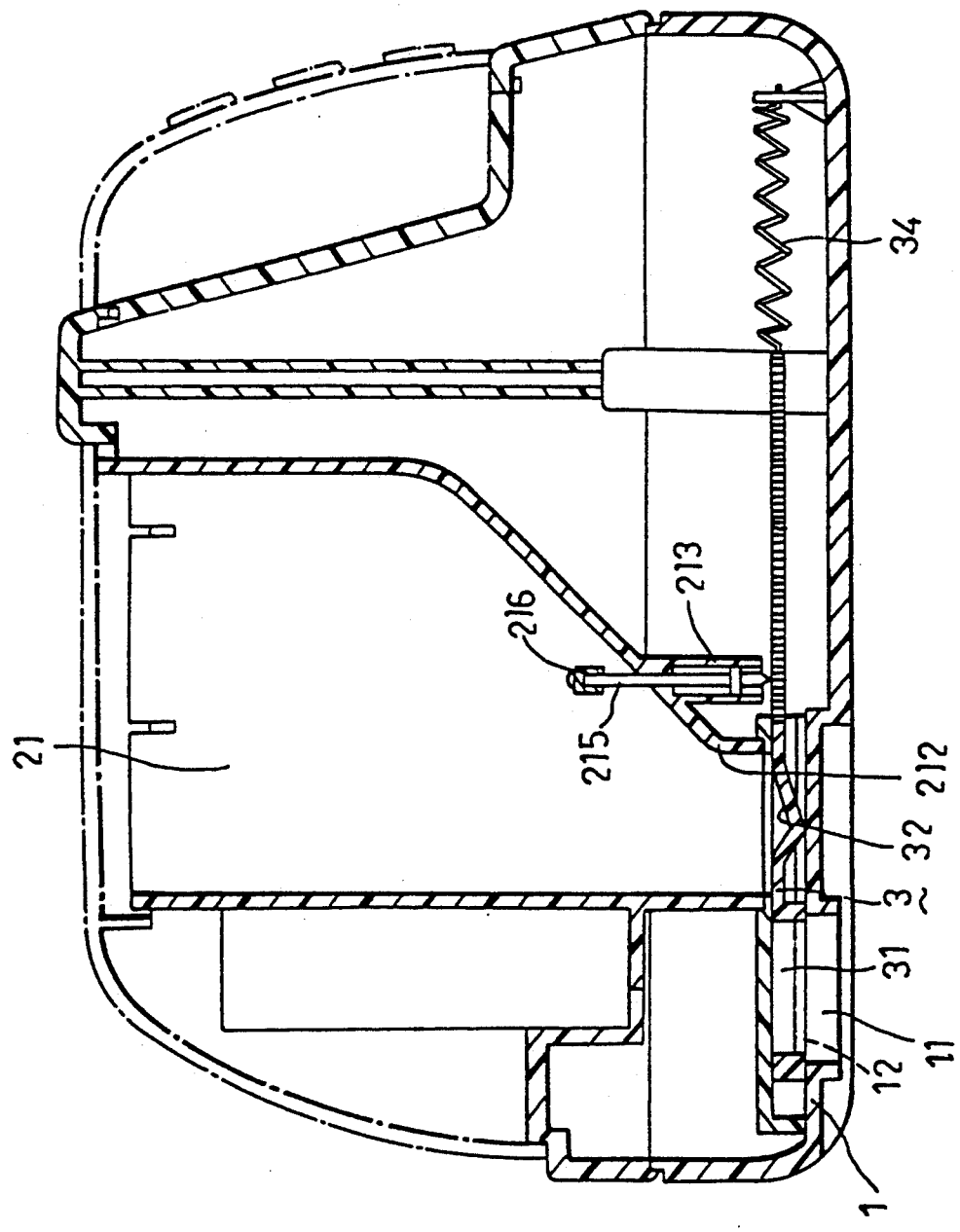
FIG. 3 shows a cross-sectional view of the preferred embodiment of the present invention in operation.

Referring to FIGS. 1 and 2, a feeding device according to the present invention is shown to comprise a casing (10) including a lower portion which has a bottom (1) with an opening (11) extending therethrough, and an upper portion which has a container (21) that is provided above the bottom (I) of the lower portion.

The container (21) in the preferred embodiment has a constricted lower section (211) with an outlet (212) formed adjacent to the bottom (I) of the lower portion and a chamber (213) to receive a depressing rod (215) therein. A compression spring (214) is sleeved around the depressing rod (215) and compresses resiliently and downwardly the depressing rod (215) in such a manner that lower and upper ends of the compression rod (215)

respectively extend out of the chamber (213). A feed vibrator (216) is fixed on the upper end of the depressing rod (215) and propels the feed located around the same so as to convey said feed toward the outlet (212) of the constricted lower portion (211) of the casing (10) when the depressing rod (215) moves vertically in the chamber (213). The upper portion further has two covering members (22, 23) to cover the upper portion and a plurality of pressing buttons (231) which are connected to switch assemblies that are provided in the casing (10).

A rectangular food-carrying plate (3) is provided between the bottom (1) of the lower portion and the container (21). The food-carrying plate (3) has a second opening (31) formed adjacent to one end thereof and which is equal in size to the first opening (11) of the bottom (1) The second opening (31) is aligned with the outlet (212) of the container (21) in the normal condition. The food-carrying plate (3) further has an inward depression (32) formed thereon adjacent to the second opening (31) upon which the lower end of the depressing rod (215) abuts resiliently, thereby retaining the food-carrying plate (3) on the bottom (I) in a stable manner. Another end of the food-carrying plate (3) is connected to a tension spring (34) which provides a tension force to the food-carrying plate (3) when the latter is moved away from the tension spring (34).

An important aspect to be observed in this preferred embodiment is that the first opening (11) of the bottom (I) and the outlet (212) of the container (21) lie in a straight line after assembly.

An inverted U-shaped covering member (4) includes a base member (40) which is mounted above the food-carrying plate (3) across the straight line on which the first and second openings (11, 31) of the bottom (1) and the food-carrying plate (3) lie, and two arm portions (41) which extend downward from the base member (40) so as to be connected to the bottom (1) of the lower portion of the casing (10) by means of screws. The lowermost portion of the container (21) is disposed on the base member (40) of the covering member (4). The base member (40) has a third opening (42) which is communicated with the outlet (212) of the container (21) and which is aligned with the second opening (31) of the food-carrying plate (3) when the food-carrying plate (3) is at the first position.

A pair of reinforcing ribs (12) are provided on the bottom (1) under the base member (40)( The ribs (12) have upper portions that support the base member (40) from beneath in such a manner that the reinforcing ribs (12) reinforce the rigidity of the covering member (4). After the covering member (4) has been thus provided, it confines a guiding path above the bottom (I) through which the food-carrying plate (3) extends.

The food-carrying plate (3) further has an elongated section with two longitudinal edges that extend out from the covering member (4). One longitudinal edge of the elongated section of the food-carrying plate (3) has a rack (333), while the other longitudinal edge has two projections (331, 332) that extend laterally and outwardly therefrom and that are associated with a sensing unit (54).

The sensing unit (54) has a light emitting element (542), a light receiving element (543) and a clearance (541) between the light emitting and receiving elements (542, 543). A driving unit (5) is disposed in the casing (10) and includes a motor (51) with a rotating shaft (511) on which a driving gear (52) is mounted. The driving gear (52) is associated with a speed reducing gear (53) which, in turn, meshes with the rack (333). The driving unit (5) is pre-arranged to be actuated by a known Central Processing Unit at different intervals, such as at 12-hour intervals or at 6-hour intervals.

When the driving unit (5) is actuated at the preset time, the food-carrying plate (3) is driven to move between a first position, wherein the second opening (31) of the food-carrying plate (3) is aligned and communicated with the outlet (212) of the container (21) so that the second opening (31) receives the feed therein. During that time, the projection (331) of the food-carrying plate (3) is in the clearance (541) of the sensing unit (54), thereby shielding the light emitting element (542) from the light receiving element (543). Thus the sensing unit (54) will give a signal for controlling the driving unit (5) to move linearly the food-carrying plate (3) in the guiding path of the covering member (4) to a second position, wherein the second opening (31) of the food-carrying plate (3) is aligned and communicated with the first opening (11) of the bottom (1) of the lower portion of the casing (10). Thus, the feed in the second opening (31) of the food-carrying plate (3) is dropped through the first opening (11) of the bottom (1). The above procedure is repeated automatically and periodically without the need for manual intervention in accordance with the objectives of the present invention.

While the food-carrying plate (3) reciprocates linearly in and out of the guiding path that is confined by the covering member (4), the guiding path, the tension spring (34) and the abutment of the lower end of the depressing rod (215) in the depression (32) of the plate (3) cooperatively prevent the food-carrying plate (3) from vibrating vertically when it slides in and out of the guiding path of the covering member (4). Thus, the food-carrying plate (3) moves in a stable fashion along on the bottom (1) of the casing (10). The reciprocating movement of the food-carrying plate (3) causes the depressing rod (215) to move up and down due to the depression (32), thereby causing the vibrator (216) to propel feed adjacent to the same to drop into the outlet (212) of the container (21). There is no need for the food-carrying plate (3) to burden as much weight as in the prior feeding device because the container (21) is mounted on the base member (40) of the covering member (4). The driving force to move the food-carrying plate (3) can be correspondingly decreased.

The food-carrying plate (3) of the preferred embodiment has a width which is much smaller than the diameter of the food-carrying plate of the prior feeding device. Since the food-carrying plate (3) moves linearly, the feed-receiving opening can be formed across the width of the food-carrying plate (3). In the prior feeding device, the food-carrying plate is circular in shape, and the feed-carrying opening is formed across the radius with the circular plate rotating angularly about its axis. If the width of the food-carrying plate of the present feeding device is equal to the radius of the circular plate of the prior feeding device, a food-carrying opening of a larger size can be formed across the width of the feed-carrying plate (3) of the present invention. Thus, flake-type feed for breeding pets can be conveyed from the container and can be released from the casing through the first opening (11) of the bottom of the casing (10). The features and objectives of the present invention are thus obtained. The casing of the feeding device of the present invention is correspondingly more compact.

Figure 4:
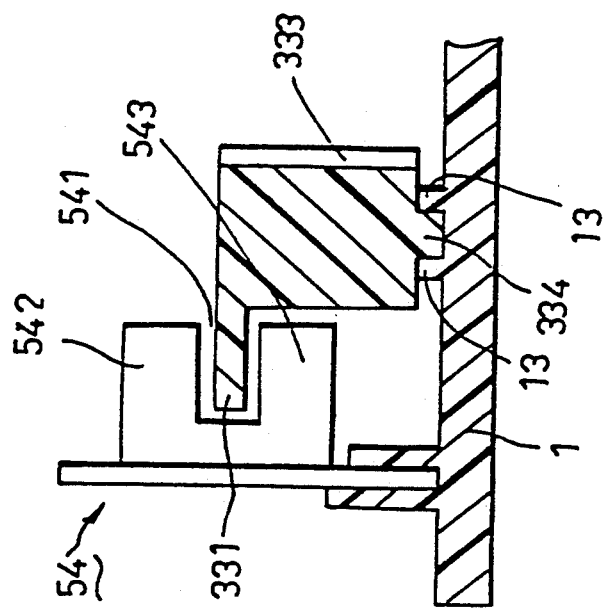
FIG. 4 illustrates a sensing unit that is employed in the feeding device of the present invention taken along the line IV—IV of FIG. 2.

Referring to FIG. 4, the bottom (1) of the casing (10) has an elongated grooved recess (13), while the food-carrying plate (3) has a projection (334) which is received in the elongated grooved recess (13) of the bottom (1). This further facilitates linear movement of the food-carrying plate (3) on the bottom (1).

While a preferred embodiment has been described and illustrated, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A feeding device comprising a casing with a bottom that has a first opening extending therethrough, a container provided above said bottom to receive feed therein, said container having an outlet formed adjacent to said bottom, and an enclosed chamber adjacent to said outlet, said chamber accommodating a depression rod and a compression spring, said first opening of said bottom and said outlet of said container lying in a straight line; a food-carrying plate provided between said bottom and said container and being movable horizontally along said bottom, said food-carrying plate having a second opening extending therethrough, said food-carrying plate having a depression formed adjacent to the second opening, a lower end of the depression rod being in contact with the depression of the plate; a driving unit moving said food-carrying plate on said bottom at pre-arranged intervals between a first position, wherein said second opening of said food-carrying plate is aligned and communicated with said outlet of aid container, and a second position, wherein said first opening of said bottom of said casing is aligned and communicated with said second opening of said food-carrying plate; an inverted U-shaped covering member which includes a base that is mounted above said food-carrying plate across said straight line and that has two opposite arm portions extending downward from said base to connect with said bottom of said casing, said container being disposed on said base of said covering member, said base of said covering member having a third opening communicated with said outlet of said container and aligned with said second opening of said food-carrying plate when said food-carrying plate is at said first position, said covering member confining a guiding path above said bottom, said food-carrying plate extending through said guiding path of said inverted U-shaped covering member to move along said straight line; and a feed vibrator being fixed on an upper end of the depression rod which extends out of the chamber; wherein said food-carrying plate includes a rack connected to and driven by said driving unit, said food-carrying plate being reciprocated linearly between said first and second positions when said rack of said food-carrying plate is driven by said driving unit so that the depression rod is moved up and down within said enclosed chamber by the food-carrying plate, while the vibrator propels the feed in the container toward the outlet.

* * * * *